United States Patent
Hughes

(10) Patent No.: US 6,561,078 B1
(45) Date of Patent: May 13, 2003

(54) DEVICE FOR SEPARATING AND REMOVING KRAEUSEN FROM BEER DURING FERMENTATION

(76) Inventor: Mark J. Hughes, P.O. Box 1429, Lusby, MD (US) 20657

( * ) Notice: Subject to any disclaimer, the term of this patent is extended or adjusted under 35 U.S.C. 154(b) by 0 days.

(21) Appl. No.: 10/029,032

(22) Filed: Dec. 28, 2001

(51) Int. Cl.$^7$ ............................................. C12C 5/00
(52) U.S. Cl. ........................ 99/277; 99/276; 435/812; 210/242.1; 210/523
(58) Field of Search ...................... 99/276, 277, 277.1, 99/278; 210/513, 523; 215/231; 220/216; 203/20

(56) References Cited

U.S. PATENT DOCUMENTS

| | | | |
|---|---|---|---|
| 1,893,411 A | 1/1933 | Hallermann | 210/242.1 |
| 3,507,208 A | 4/1970 | Patchen | 99/276 |
| 3,679,600 A | 7/1972 | Hahm | 435/812 |
| 4,329,918 A | 5/1982 | Kuhtreiber | 99/276 |
| 4,373,024 A | 2/1983 | Hunt | 435/812 X |
| 4,750,975 A | 6/1988 | Parker et al. | 202/154 |
| 5,802,956 A | 9/1998 | Robertson et al. | 99/276 |

FOREIGN PATENT DOCUMENTS

| | | |
|---|---|---|
| DE | 3333541 | 8/1985 |
| FR | 2343047 | 9/1977 |
| SU | 718958 | 5/1982 |
| SU | 1255193 | 5/1984 |

*Primary Examiner*—Reginald L. Alexander
(74) *Attorney, Agent, or Firm*—Stephen R. Greiner

(57) ABSTRACT

A device for separating and removing kraeusen from fermenting beer. The device includes a pan having a circular bottom wall with a peripheral side wall extending upwardly therefrom. In the center of the bottom wall is a cone-shaped recess that serves as a well for the collection of particulate matter falling from suspension in kraeusen. Extending upwardly from the bottom of the recess to a height approaching that of the side wall is a tubular passageway for the upward passage of kraeusen into the pan. The recess may be covered with a screen or perforated plate upon which particulate matter can collect. An aperture is provided in the tubular passageway at the top of the recess to permit any beer carried by kraeusen into the pan to drain from the pan.

4 Claims, 1 Drawing Sheet

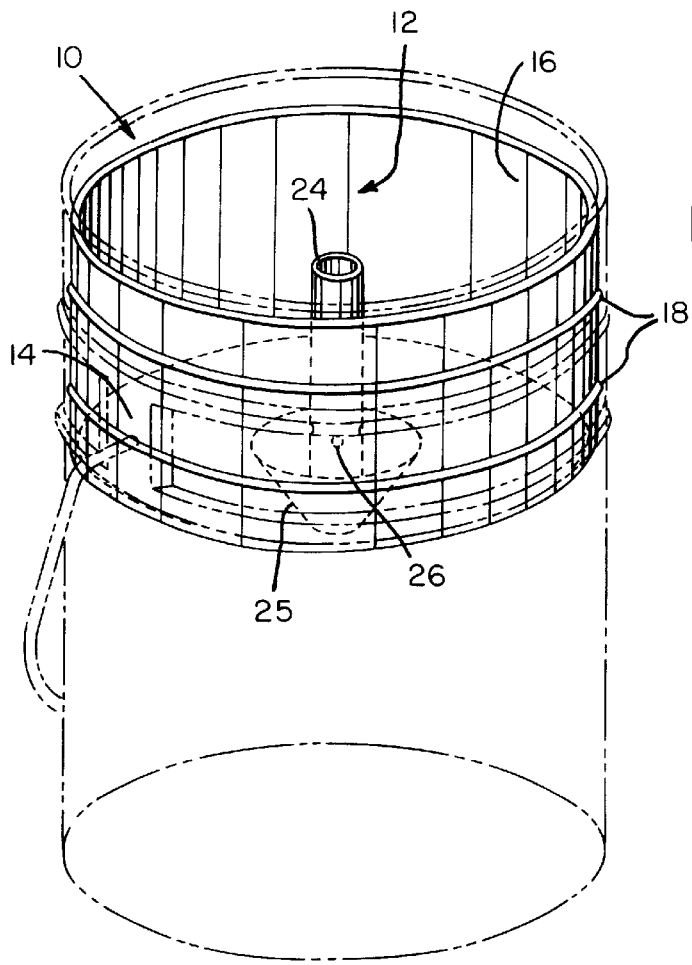
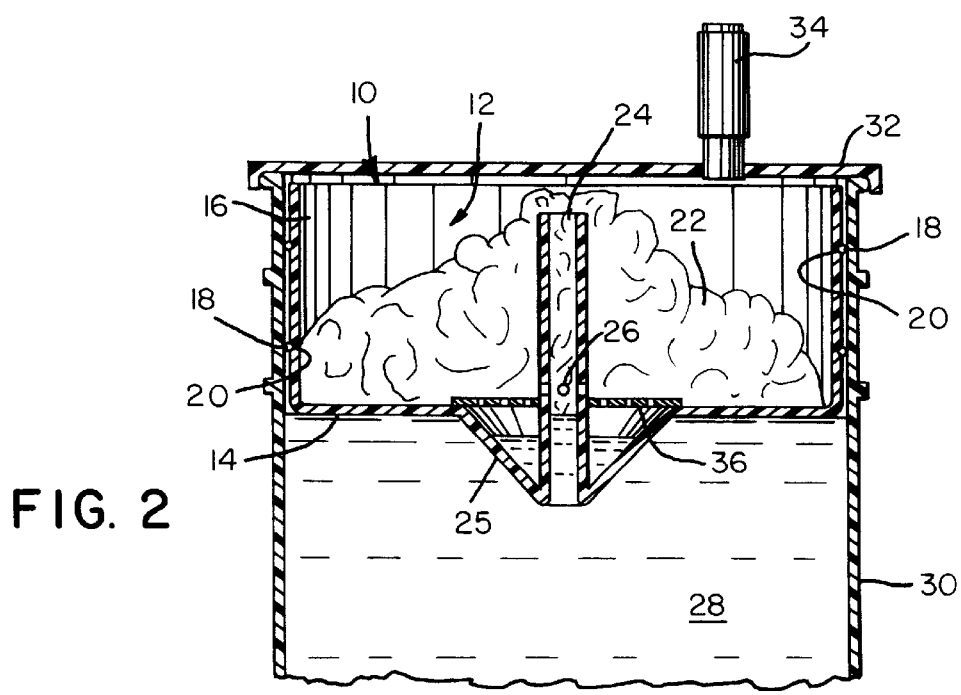

DEVICE FOR SEPARATING AND REMOVING KRAEUSEN FROM BEER DURING FERMENTATION

FIELD OF THE INVENTION

The present invention relates generally to apparatus used in the primary fermentation of alcoholic beverages.

BACKGROUND OF THE INVENTION

The home brewing of beer is a popular and growing pastime. Many home brewers have come to find that they can produce a brew that is of a higher quality and lower price than that which is store-bought. Making a "perfect" beer, however, is not easy.

Beer brewing is typically accomplished in a number of stages, each of which has requirements for: timing, ingredient measuring, sanitizing, and mixing. Usually, the first stage in making beer involves making a special liquid for fermentation. Next, this liquid is subjected to primary and secondary fermentation. Finally, the liquid is bottled for subsequent consumption. Errors made during any stage can result in a beer that is of poor quality and, in some cases, is undrinkable.

Primary fermentation is typically performed in a sealed, food grade bucket. A foam (kraeusen) is produced at the top of the fermenting liquid and this foam contains bitter hop resins and other organic materials. Removal of kraeusen results in a better tasting beer, but since kraeusen is primarily beer, removing it by known methods results in the waste of a significant quantity of beer. There is, therefore, a need for a simple and effective device for removing kraeusen from beer during its primary fermentation without the loss of much beer.

SUMMARY OF THE INVENTION

In light of the problems associated with the home brewing of beer and particularly in light of the problems associated with removing kraeusen during primary fermentation, it is a principal object of the invention to provide a device that can easily separate and remove kraeusen from fermenting beer. The preferred device automatically performs this task in a failsafe manner.

It is another object of the invention to provide a device of the type described that can be used with minimal instruction, with existing fermentation vessels or containers, and without additional tools.

It is an object of the invention to provide improved elements and arrangements thereof in a device for the purposes described which is uncomplicated and lightweight in construction, inexpensive to manufacture, and dependable in use.

Briefly, the device in accordance with this invention achieves the intended objects by featuring a pan having a circular bottom wall with a peripheral side wall extending upwardly therefrom. In the center of the bottom wall is a cone-shaped recess that serves as a well for the collection of heavy liquids and particulate matter falling from suspension in kraeusen. Extending upwardly from the bottom of the recess is a tubular passageway for the upward passage of kraeusen into the pan. A plurality of apertures is provided in the tubular passageway at the top of the recess to permit beer carried by kraeusen into the pan to drain from the pan.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is a perspective view of a device for separating and removing kraeusen from fermenting beer positioned within a bucket for use.

FIG. 2 is a cross-sectional view of the device of FIG. 1 with a perforated disk positioned atop the cone shaped recess.

Similar reference characters denote corresponding features consistently throughout the accompanying drawings.

DETAILED DESCRIPTION OF THE PREFERRED EMBODIMENT

Referring now to the FIGS., a device for separating and removing kraeusen from fermenting beer in accordance with the present invention is shown at 10. Device 10 includes a pan 12 having a circular bottom wall 14 with a peripheral side wall 16 extending upwardly therefrom. A pair of rubber gaskets 18 extends outwardly from peripheral grooves 20 in side wall 16. In the center of bottom wall 14 is a cone-shaped recess 25 that serves as a well for the collection of heavy liquids and particulate matter falling from suspension in kraeusen 22. Extending upwardly from the bottom of recess 25 to a height approaching that of side wall 16 is a tubular passageway 24 for the upward passage of kraeusen 22 into pan 12. A plurality of apertures 26 is provided in tubular passageway 24 at the top of the recess to permit beer carried by kraeusen 22 into pan 12 to drain from pan 12.

Use of device 10 is straightforward. First, a measured quantity of liquid 28 to be fermented is poured into a food-safe bucket 30 with a measured quantity of yeast. Next, pan 12 is positioned atop liquid 28 with seals 18 snugly engaging bucket 30 so as to close the annular space between side wall 16 and bucket 30 to fluid circulation. Then, lid 32 is placed on bucket 30 to prevent contamination of liquid 28. A conventional airlock 34 is provided on lid 32 to permit the escape to the atmosphere of excess carbon dioxide generated during the fermentation process by the action of yeast on liquid 28.

During fermentation, liquid 28 produces kraeusen 22 that, because of its low density, flows upwardly through passageway 24 and into pan 12. Relatively heavy and resinous components of kraeusen 22 settle, under the influence of gravity, from pan 12 into recess 25 and collect there. A perforated plate or screen 36 positioned over recess 25 also collects some of the resinous components of kraeusen 22.

In addition to unwanted, heavy, and resinous components, kraeusen 22 exudes beer as it settles in pan 12. Beer, being relatively less dense than the resinous components, will flow from pan 12 through apertures 26 in passageway 24 when recess 25 is full and back into liquid 28 in bucket 30 for further fermentation. After a predetermined period of fermentation, liquid 28 is drawn from bucket 30 leaving the unwanted components of kraeusen behind in device 10.

It is of note that device 10 will not easily settle into liquid 28 during use. Forming device 10 of a low-density plastic or other light, food-grade material ensures that device 10 will "float" above liquid 28. Additionally, by changing the sizes of gaskets 18 employed on side wall 16, device 10 can be made to snugly fit against, and grip the interiors of, buckets 30 of varying diameter.

After use, device 10 is removed from bucket 30 and washed with soap and water. The now-clean device 10 is ready for immediate reuse. Of course, its compact size permits device 10 to be conveniently stored in a cabinet or drawer until it is needed at some later date.

While the invention has been described with a high degree of particularity, it will be appreciated by those skilled in the art that modifications may be made thereto. For example, device 10 need not be provided with only one recess 25 and passageway 24; their number and location may be increased to optimize the collection of heavy components from kraeusen 22. Therefore, it is to be understood that the present invention is not limited to the sole embodiment described above, but encompasses any and all embodiments within the scope of the following claims.

I claim:

1. A device for separating and removing kraeusen from fermenting beer, said device comprising:

a pan having a bottom wall with a recess therein and also having a peripheral side wall extending upwardly from said bottom wall;

a tubular passageway extending upwardly from the bottom of said recess; and, an aperture in said tubular passageway located at the top of said recess.

2. A device for separating and removing kraeusen from fermenting beer, said device comprising:

a pan having a circular bottom wall with a recess in the center thereof and also having a peripheral side wall extending upwardly from said circular bottom wall;

a tubular passageway extending upwardly from the bottom of said recess, said tubular passageway extending upwardly to a height substantially equal to that of said peripheral side wall; and, an aperture in said tubular passageway at the top of said recess for draining said pan.

3. A device for separating and removing kraeusen from fermenting beer, said device comprising:

a pan having a circular bottom wall with a recess in the center thereof and also having a peripheral side wall extending upwardly from said circular bottom wall;

a tubular passageway extending upwardly from the bottom of said recess, said tubular passageway extending upwardly to a height substantially equal to that of said peripheral side wall;

a perforated disk on said tubular passageway and covering said recess; and, an apertures in said tubular passageway at the top of said recess for draining said pan.

4. The device according to claim 3 further comprising a peripheral gasket extending outwardly from said side wall for providing a seal against a fermenting vessel.

* * * * *